(12) United States Patent
Kurokawa

(10) Patent No.: US 7,034,867 B2
(45) Date of Patent: Apr. 25, 2006

(54) DIGITAL CAMERA

(75) Inventor: Mitsuaki Kurokawa, Toyonaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1120 days.

(21) Appl. No.: 09/902,566

(22) Filed: Jul. 12, 2001

(65) Prior Publication Data
US 2002/0008782 A1 Jan. 24, 2002

(30) Foreign Application Priority Data
Jul. 14, 2000 (JP) ............................. 2000-213654

(51) Int. Cl.
H04N 5/228 (2006.01)
H04N 5/14 (2006.01)
H04N 5/217 (2006.01)
H04N 5/222 (2006.01)

(52) U.S. Cl. .................. 348/222.1; 348/577; 348/624; 348/333.02

(58) Field of Classification Search ............... 348/242, 348/253, 256, 624, 577, 645, 708, 333.02; 358/516
See application file for complete search history.

(56) References Cited

U.S. PATENT DOCUMENTS

| | | | | |
|---|---|---|---|---|
| 5,291,276 A | * | 3/1994 | Matsumoto et al. | 348/708 |
| 5,333,070 A | * | 7/1994 | Ichikawa | 348/645 |
| 5,446,504 A | * | 8/1995 | Wada | 348/645 |
| 5,668,596 A | * | 9/1997 | Vogel | 348/222.1 |
| 5,691,779 A | * | 11/1997 | Yamashita et al. | 348/645 |
| 6,618,079 B1 | * | 9/2003 | Higuchi | 348/223.1 |
| 6,711,289 B1 | * | 3/2004 | Sakamoto | 348/645 |

FOREIGN PATENT DOCUMENTS

| | | |
|---|---|---|
| JP | 10-079954 | 3/1998 |
| JP | 10-285414 | 10/1998 |
| JP | 11-018002 | 1/1999 |

* cited by examiner

Primary Examiner—Ngoc-Yen Vu
Assistant Examiner—Luong T. Nguyen
(74) Attorney, Agent, or Firm—Westerman, Hattori, Daniels & Adrian, LLP

(57) ABSTRACT

A digital camera includes an LCH conversion circuit. The LCH conversion circuit detects an L component value, a C component value and an H component value from each of pixel signals forming an image signal of an object being photographed. A plurality of reference L component values, reference C component values and reference H component values are held on a reference value table. A plurality of target L component values, target C component values and target H component values are held on a target value table. An L control circuit, a C control circuit and an H control circuit correct the L component value, the C component value and the H component value of each pixel based upon the reference value table and the target value table. A plurality of target values held on the target value table is arbitrarily controlled by a key operation or the like by an operator.

11 Claims, 14 Drawing Sheets

| N | HUE (H) | CHROMA (C) | LUMINANCE (L) |
|---|---|---|---|
| 0 | 20 | 800 | 104.956 |
| 1 | 55 | 690 | 184.515 |
| 2 | 78 | 750 | 147.577 |
| 3 | 118 | 530 | 121.845 |
| 4 | 135 | 660 | 162.774 |
| 5 | 160 | 610 | 184.893 |
| 6 | 188 | 570 | 166.518 |
| 7 | 225 | 780 | 126.177 |
| 8 | 245 | 840 | 153.17 |
| 9 | 275 | 610 | 94.075 |
| 10 | 305 | 670 | 190.223 |
| 11 | 338 | 610 | 187.512 |

| N | HUE (H) | CHROMA (C) | LUMINANCE (L) |
|---|---|---|---|
| 0 | 20 | 600 | 88.006 |
| 1 | 48 | 530 | 184.154 |
| 2 | 75 | 600 | 119.846 |
| 3 | 115 | 720 | 96.69 |
| 4 | 135 | 690 | 142.925 |
| 5 | 163 | 690 | 160.774 |
| 6 | 195 | 630 | 167.763 |
| 7 | 223 | 900 | 84.193 |
| 8 | 250 | 970 | 144.961 |
| 9 | 280 | 700 | 73.102 |
| 10 | 305 | 500 | 185.965 |
| 11 | 340 | 540 | 189.011 |

○ REFERENCE VALUE
□ TARGET VALUE
△ INPUTTED PIXEL VALUE

○ REFERENCE VALUE
□ TARGET VALUE
△ INPUTTED PIXEL VALUE
▲ CORRECTTED PIXEL VALUE

| 0 | 1 | 2 | 3 |
|---|---|---|---|
| 4 | 5 | 6 | 7 |
| 8 | 9 | 10 | 11 |

DIGITAL CAMERA

BACKGROUND OF THE INVENTION

1. Field of the Invention

The present invention relates to a digital camera. Specifically the present invention relates to a digital camera for subjecting an image signal of an object being photographed to an image quality control.

2. Description of the Prior Art

In a digital camera, a color reproduction characteristic varies depending on what signal process is subjected to an image signal outputted from an image sensor. Due to this, a signal process technology is an important element in improving a color expression. However, in a conventional digital camera, it is difficult to perform a suitable color correction corresponding to a condition of an object, whereby there was a tendency toward being limited to a color correction on the assumption that the object would be taken in a good condition. Furthermore, there was also a problem that, as a result of an inconsistent characteristic of an image sensor, a color of a photographed object differed depending on a camera. Still further, it was impossible to perform a color correction on a camera as a user pleased, upon the correction, an image signal of the photographed object had to be taken into a personal computer (PC), and then corrected on the PC.

SUMMARY OF THE INVENTION

Therefore, a primary object of the present invention is to provide a digital camera capable of controlling a color reproduction characteristic as a user pleases.

Another object of the present invention is to provide a digital camera capable of preventing a differing color expression depending on each product.

According to the present invention, a digital camera for subjecting an image signal of a photographed object to an image quality control comprises: a pixel value detector to detect a pixel value which relates to a predetermined image quality evaluation element from each pixel signal forming the image signal; a first table having a plurality of reference values which relates to the predetermined image quality evaluation element; a second table having a plurality of target values which relates to the predetermined image quality evaluation element; a corrector to correct the pixel value based upon the first table and the second table; and a controller to control a plurality of the target values arbitrarily.

If an object is photographed, the pixel value detector detects the pixel value which relates to the predetermined image quality evaluation element from each pixel signal forming the image signal of the photographed object. On the other hand, the plurality of reference values and the plurality of target values which relate to the same image quality evaluation element are respectively held on the first table and the second table. The corrector corrects the pixel value detected by the pixel value detector based upon the first table and the second table. Thus, the image signal of the photographed object is subjected to an image quality control. Here, the plurality of the target values held on the second table is controlled arbitrarily by the controller. Due to this, a color expression characteristic is controlled as a user pleases.

In an embodiment of the present invention, the reference values which meet a predetermined condition between the pixel values are detected by a reference value detector from the first table, the target values corresponding to the detected reference values are detected by a target value detector from the second table. The pixel value is corrected by the pixel value corrector based upon the reference values and the target values detected by the reference value detector and the target value detector In a preferred embodiment, a predetermined image quality evaluation element includes a hue, the reference value detector detects two reference values which sandwich the pixel value in relation to the hue, and the target value detector detects two target values corresponding to two detected reference values. When the two detected reference values are noted, the hue component of one reference value is bigger than the hue component of the pixel value, and the hue component of another reference value is smaller than the hue component of the pixel value.

In an aspect of the preferred embodiment, a hue corrector included in the pixel value corrector corrects a hue component of the pixel value based upon hue components of the two reference values and the two target values as detected.

In another aspect, the predetermined image quality evaluation element further includes a chroma, a chroma corrector included in the pixel value corrector corrects a chroma component of the pixel value based upon chroma components of the two reference values and the two target values as detected.

In still another aspect, the predetermined image quality evaluation element further includes a luminance, a luminance corrector included in the pixel value corrector corrects a luminance component of the pixel value based upon luminance components of the two reference values and the two target values as detected.

In another embodiment of the present invention, a character displayer displays a character showing the target value in an area formed by a plurality of coordinate axes. The character moves arbitrarily by a mover within the area, and a renewer renews the target value depending upon a position of the moved character. Thus, the target value is arbitrarily controlled.

In a preferred embodiment, a color expresser included in the controller expresses a color defined by the target value renewed by the renewer.

In another preferred embodiment, a target value displayer included in the controller displays the target value renewed by the renewer.

In another embodiment of the present invention, when a specific object on which a plurality of colors are drawn is photographed, a specific image signal corresponding to the specific object is generated by a specific image signal generator. A plurality of the reference values is generated by a reference value generator based upon this specific image signal.

According to the present invention, a digital camera for subjecting the image signal of a photographed object to an image quality control comprises: a pixel value detector to detect a pixel value which relates to a predetermined image quality evaluation element from each pixel signal forming the image signal; a first table holding a plurality of reference values which relate to the predetermined image quality evaluation element; a second table holding a plurality of target values which relate to the predetermined image evaluation element; and a corrector to correct the pixel value based upon the first table and the second table, wherein a plurality of reference values are determined based upon the reference image signal obtained by photographing a reference object.

When an object is photographed, the pixel value detector detects the pixel value which relates to the predetermined image quality evaluation element from each pixel signal forming the image signal of the photographed object. On the other hand, a plurality of reference values and a plurality of target values which relate to the same image quality evaluation element are respectively held on the first and second tables. The corrector corrects the pixel value detected by the pixel value detector based upon the first and the second table. Thus, the image quality controller is subjected to the image signal of the photographed object. Here, the reference values set on the first table are determined based upon the reference image signal obtained by photographing a reference object. Due to this, it is possible to prevent a differing color reproduction characteristic depending on each camera.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing a reference value table;

FIG. 4 is an illustrative view showing a target value table;

DETAILED DESCRIPTION OF THE PREFERRED EMBODIMENTS

Figure 1:
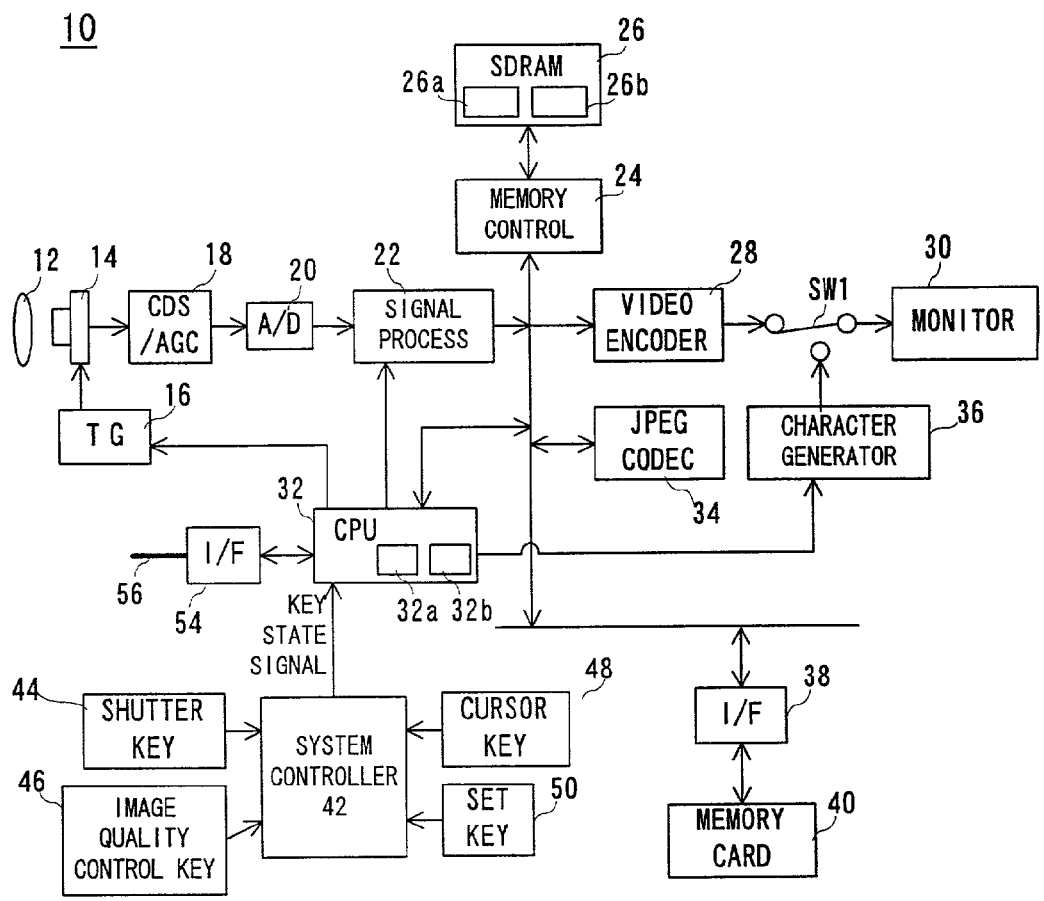
FIG. 1 is a block diagram showing one example of this present invention.

Referring to FIG. 1, a digital camera 10 of this embodiment includes a focus lens 12. An optical image of an object is incident on a light-receiving surface of a CCD imager 14 via the focus lens 12. On the light-receiving surface, a camera signal (raw image signal) corresponding to the incident optical image is generated by a photoelectric conversion. It is noted that the light-receiving surface is covered by a color filter of the Bayer pattern (not represented), and each of pixel signals that forms a camera signal has no more than one of any R, G or B.

A timing generator (TG) 16 repeatedly reads out a camera signal at a predetermined frame rate from the CCD imager 14 upon given a process command from a CPU 32. The read camera signal is converted into a digital signal in an A/D converter 20 via a well-known noise removal and a level control in a CDS/AGC circuit 18.

A signal process circuit 22 subjects a camera data outputted from the A/D converter 20 to signal processes such as a color separation, a white balance control, and a YUV conversion so as to generate an image data consisted of a luminance component (Y data) and color difference components (U data, V data). The generated image data is applied to a memory control circuit 24, and is written into an image data storage area 26a in an SDRAM 26 by the memory control circuit 24.

A video encoder 28 causes the memory control circuit 24 to read the image data in the image data storage area 26a in response to a process command from the CPU 32. The read image data is then encoded into an NTSC-formatted composite image signal, and the encoded composite image signal is applied to a monitor 30 through a switch SW1. As a result, an image corresponding to the composite image signal is displayed on a screen.

A character generator 36, upon given a character display command from the CPU 32, generates a desired character signal. The character signal is applied to the monitor 30 by way of the switch SW1. Due to this, a desired character is displayed on the screen by an OSD manner.

A JPEG CODEC 34, upon given a compression command from the CPU 32, causes the memory control circuit 24 to read an image data of one frame stored in the image data storage area 26a, and subjects the read image data to a compression process in agreement with a JPEG format. On obtaining the compressed image data, the JPEG CODEC 34 gives the generated compressed image data to the memory control circuit 24. The compressed image data is stored in a compressed data storage area 26b by the memory control circuit 24. On the other hand, on receiving a decompression command from the CPU 32, the JPEG CODEC 34 causes the memory control circuit 24 to read the compressed image data of one frame stored in the compressed data storage area 26b, and subjects the read compressed image data to a decompression process in agreement with the JPEG format. On obtaining the decompressed image data, the JPEG CODEC 34 stores the decompressed image data in the image data storage area 26a through the memory control circuit 24.

The CPU 32 executes a process of recording/reproducing of a compressed image data by itself. Upon recording, the CPU 32 reads out the compressed image data stored in the compressed data storage area 26b through the memory control circuit 24, creates header information including a file name or the like by itself, and then records the compressed image data and the header information through an I/F circuit 38 into a memory card 40. Therefore, an image file is formed in the memory card 40. Upon reproducing, the image file is read from the memory card 40 through the I/F circuit 38. The compressed image data included in the read compressed image file is written into the compressed data storage area 26*b* through the memory control circuit 24 by the CPU 32.

Note that the memory card 40 is a removable non-volatile recording medium, and becomes accessible by the CPU 32 when inserted into a slot (not represented).

Various operation keys 44–50 are connected to a system controller 42. When a key operation is made by an operator, a key state signal showing a state of the key at that time is given from the system controller 42 to the CPU 32. A shutter key 42 is a key to give off a picture-taking trigger of the object, and an image quality control key 46 is a key to select an image quality control mode. A cursor key 48 is a key to move a cursor when an image quality control menu when the menu is displayed, and by operating this key the cursor moves up, down, left or right. A set key 50 is a key to determine a menu item pointed at by the cursor.

Figure 2:
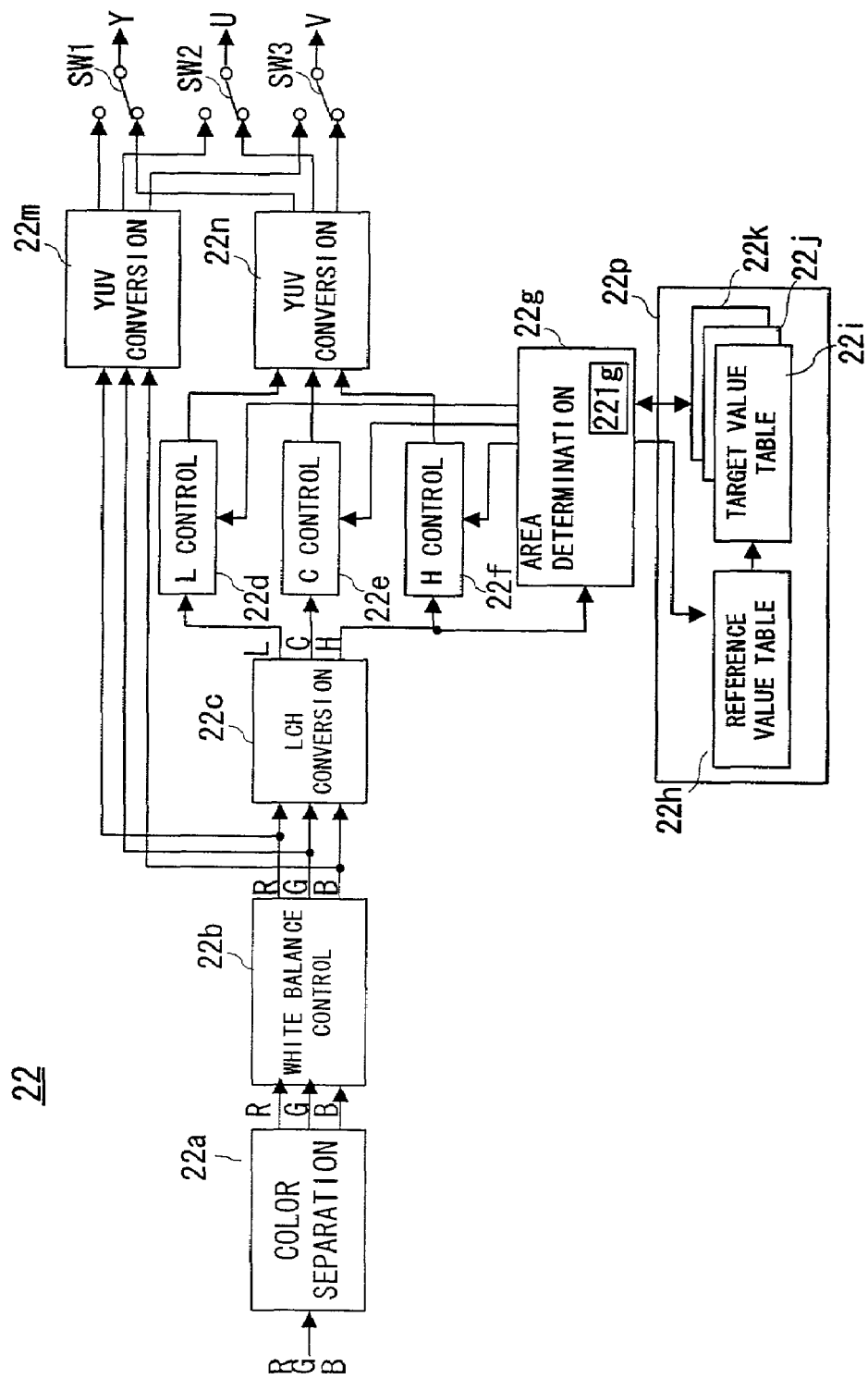
FIG. 2 is a block diagram showing one example of a signal process circuit.

The signal processing circuit 22 is constituted as shown in FIG. 2. The camera data outputted from the A/D converter 20 is subjected to a color separation by a color separation circuit 22*a*. In other words, as each pixel data that constitutes the camera data has only one of a R component, a G component or a B component, two color components missing in each pixel are complemented by the color separation. From the color separation 22*a*, the R component, the G component and the B component which constitute each of the pixels are outputted simultaneously. The R component, G component and the B component outputted by one pixel by one pixel are applied to the LCH conversion circuit 22*c* via a white balance control circuit 22*b* and then converted into an L component (luminance component), a C component (chroma component) and an H component (hue component).

The concerted L component, C component and H component are individually given to an L control circuit 22*d*, a C control circuit 22*e* and an H control circuit 22*f*. The L control circuit 22*d*, the C control circuit 22*e* and the H control circuit 22*f*, subject the inputted L component, C component and H component to predetermined processes respectively so as to obtain a corrected L component, a corrected C component and a corrected H component. The corrected H component, C component and L component are subsequently converted into a Y component, a U component and a V component by a YUV conversion circuit 22*n*, and the converted Y component, the U component and the V component are outputted via a switch SW1, a SW2 and a SW3. The YUV conversion circuit 22*n* then performs a so-called 4:2:2 conversion (or 4:1:1 conversion), and the Y component, U component and V component outputted from the switches SW1–SW3 has a ratio of 4:2:2 (or 4:1:1).

It is noted that the switches SW1–SW3 are connected with the side of a YUV conversion circuit 22*m* only when a predetermined order is given from an inspection device in inspection process. In this case, the Y component, U component and V component generated by the YUV conversion circuit 22*m* based upon the R component, G component and the B component outputted from the white balance control circuit 22*b* are outputted via the switches SW1–SW3. The YUV conversion circuit 22*nm* also performs a so-called 4:2:2 conversion (or 4:1:1 conversion), and the Y component, U component and V component from an inspection device are outputted from an inspection device at a ratio of 4:2:2 (or 4:1:1).

The H component outputted from the LCH conversion circuit 22*c* is also given to an area determination circuit 22*g*. Referring to a reference value table 22*h*, the area determination circuit 22*g* determines an area to which the H component given by the LCH conversion circuit 22*c* belongs. The area determination circuit then reads a reference value corresponding to the determination result from the reference value table 22*h*, and reads a target value corresponding to the determination result read from one of target value tables 22*i*–22*k*.

Figure 5:
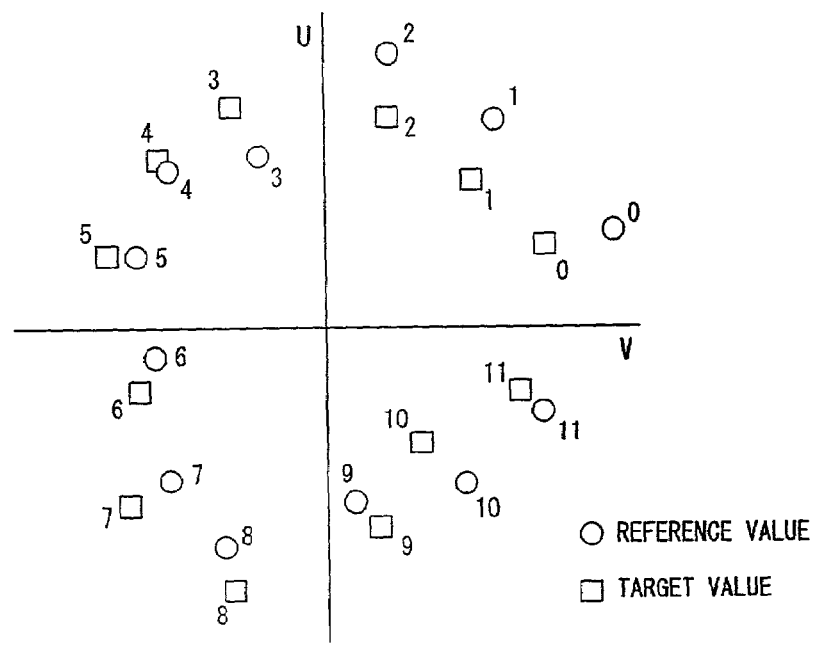
FIG. 5 is a color distribution map on which a reference value and a target value are disposed.
Figure 6:
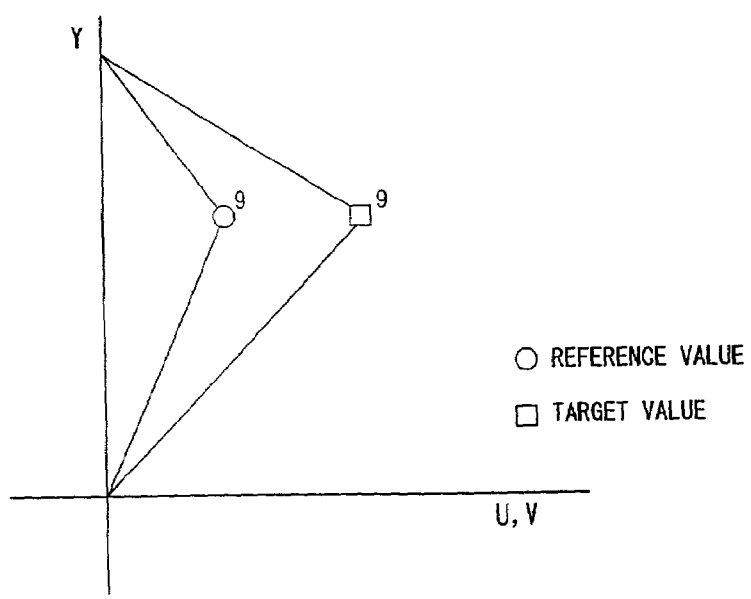
FIG. 6 is a luminance distribution map in which a reference value and a target value are disposed.

Referring to FIG. 3, 12 reference H component values, 12 reference C component values and 12 reference component values are stored in a reference value table 22*h*. H, C and L means hue, chroma and luminance respectively, and each of them is a part of an image quality evaluation element. Same reference value Nos. N (0–11) are assigned to a reference H component value, a reference C component value, and a reference L component value which are mutually relevant, and a reference value is defined by three component values (reference H component value, reference C component value and reference L component value) whose reference value Nos. are in common. These 12 reference values are distributed in a YUV space shown in FIGS. 5 and 6. It is noted that only the reference value whose reference value No. is "9" is shown in FIG. 6.

In the meantime, target value tables 22*i*–22*k* are formed as shown in FIG. 4. Similar to the reference value table 22*h* shown in FIG. 3, 12 target H components, 12 target C components and 12 target components in regard to three image quality evaluation elements of hue (H), chroma (C) and luminance (L) are set, and the target value is defined by the target H component value, the target C component value and the target L component value assigned to the same target value No. N (=0–11). When the target H component value, the target C component value and the target L component value show numerical values as shown in FIG. 4, 12 target values are distributed in the YUV space as shown in FIGS. 5 and 6. It is noted that only the target value whose target value No. is "9" is shown in FIG. 6.

The target table values 22*i*–22*k* are different from the reference value table 22*h* in that each of the target values is changeable. In other words, the reference H component value, the reference C component value, and the reference L component value set on the reference value table 22*h* are set in advance in manufacturing process, and are unable to be changed freely by an operator. Contrary to that, the target H component value, the target C component value and the target C component value can be changed arbitrarily by the operator. It is noted that both the reference value table 22*h* and the target value tables 22*i*–22*k* are stored in a non-volatile memory 22*p*.

Figure 7:
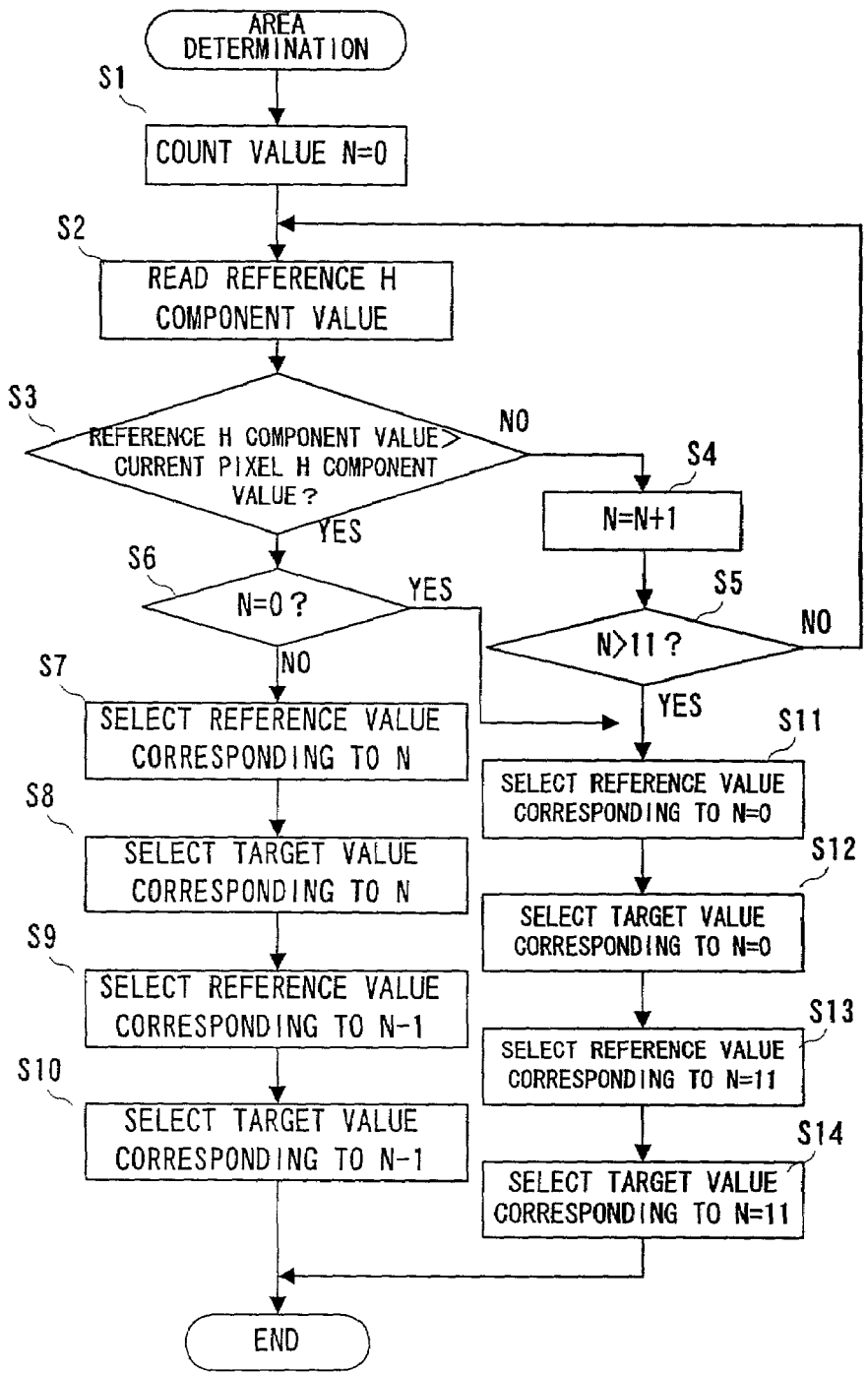
FIG. 7 is an illustrative view showing one part of a function of an area determination circuit.

The area determination circuit 22*g* performs the area determination and a selecting of the reference value and the target value in accordance with the area determination result, by using the reference value table 22*h* and one of the target value tables 22*i*–22*k*. Concretely, a flowchart process shown in FIG. 7 is carried out one pixel by one pixel. In step 1 process sets a count value N of a counter 221*g* into "0", and in step 2 the reference H component value corresponding to the count value N is read from the reference value table 22*h*. In step 3 the H component value of the current pixel (current pixel H component) inputted from the LCH conversion circuit 22 is compared with the reference H component value read from the reference value table 22*h*. If the reference H component value>the current pixel H component is determined in the step 3, the count value N is determined in step 6. If N>0 stands, steps S7–S10 are carried out, and if N=0 stands, steps S11–S14 are carried out. In the meantime, if the reference H component value≦the current pixel H component value stand, in step S4 the count value N is incremented, and in the following step S5 the renewed count value N is compared with "11". If N≦11 stands, the process returns to the step S2. However, N>11 stands, the process carries out the steps S11–S14.

In step 7 the reference H component value, the reference C component value and the reference L component value corresponding to the count value N at this time are selected from the reference value table 22h as Hr1, Cr1 and Lr1. In step S8 the target H component value, the target C component value and the target L component value corresponding to the count value N at this time are selected from any one of the target value tables 22i–22k (arbitrary target value table selected in advance) as Ht1, Ct1 and Lt1. In step 9 the reference H component value, the reference C component value and the reference L component value corresponding to the count value N−1 are selected from the reference value table 22h, and in step 10 the target H component value, the target C component value and the target L component value corresponding to the count value N−1 are selected from any one of the target value tables 22i–22k (arbitrary target value table selected in advance) as Ht2, Ct2 and Lt2.

On the other hand, in the step S11 the reference H component value, the reference C component value and the reference L component value corresponding to a count value N=0 are selected from the reference value table 22h as Hr1, Cr1 and Lr1, and in the step S12 the target H component value, the target C component value and the target L component value corresponding to the count value N=0 are selected from any one of the target value tables 22i–22k (arbitrary target value table selected in advance) as Ht1, Ct1 and Lt1. Furthermore, in step S13 the reference H component value, the reference C component value and the reference L component value corresponding to a count value N=11 are selected from the reference value table 22h as Hr2, Cr2 and Lr2, and in step S14 the target H component value, the target C component value and the target L component value corresponding to the count value N=11 are selected from the reference value table 22h from any one of the target value tables 22i–22k (arbitrary target value table selected in advance) as Ht2, Ct2 and Lt2.

In this manner, two reference values which sandwich the current pixel values in regard to a hue and two target values corresponding to these two reference values are detected. It is noted that a reading destination of the target values in the steps S8, S10, S12 and step S14 is the same target value table.

The reference H component value Hr1, Hr2 and the target H component value Ht1, Ht2 are applied to the H control circuit 22f. Furthermore, the reference C component value Cr1, Cr2 and the target C component value Ct1, Ct2 are applied to the C control circuit 22e. Still furthermore, the reference L component value Lr1, Lr2 and the target L component value Lt1, Lt2 are applied to the L control circuit 22d.

Figure 8:
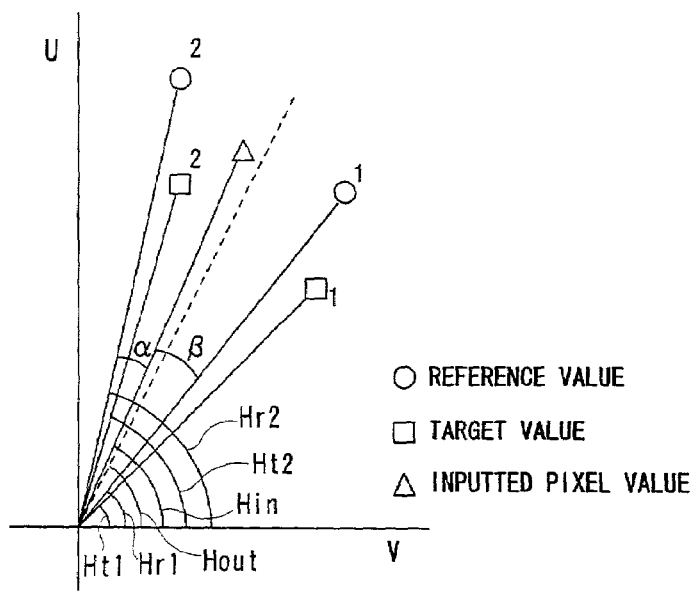
FIG. 8 is an illustrative view showing one part of a function of an embodiment in FIG. 1.

The H control circuit 22f fetches the current pixel H component value Hin from the LCH conversion circuit 22c, and calculates a corrected H component value Hout according to the equation (1). The calculated corrected H component value Hout shifts to a degree indicated by a dotted line in FIG. 8.

$$Hout=(Ht2\times\beta+Ht1\times\alpha)/(\alpha+\beta) \quad (1)$$

$$\alpha=Hr2-Hin$$

$$\beta=Hr1-Hin$$

The H control circuit 22f outputs degree data $\alpha(=Hr2-Hin)$ and $\beta(=Hr1-Hin)$ to the C control circuit 22e and the L control circuit 22d, and outputs degree data $\gamma(=Ht2-Hout)$ and $\delta(=Ht1-Hout)$ to the L control circuit 22d.

Figure 9:
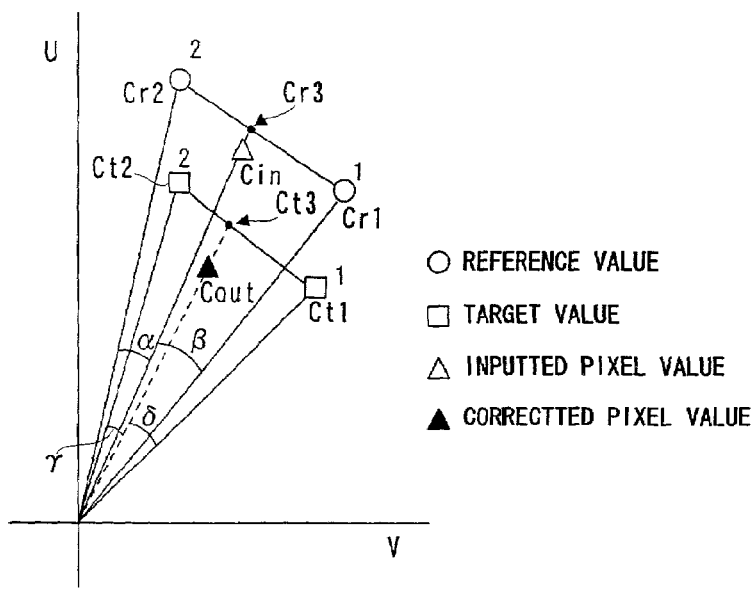
FIG. 9 is an illustrative view showing another part of a function of an embodiment in FIG. 1.

The C control circuit 22e performs a calculation shown in the equation (2) onto a current pixel C component value Cin fetched from the LCH conversion circuit 22c, and calculates a corrected C component value Cout shown in FIG. 9.

$$Cout=Cin\times\{Ct1+(Ct2-Ct1)\times\beta/(\alpha+\beta)\}/\{Cr1+(Cr2-Cr1)\times\beta/(\alpha+\beta)\} \quad (2)$$

The C control circuit 22e further calculates, performing a calculation of the equation (3) the C component value Cr3 at the intersection coordinate of a straight line that connects CH system coordinates (0,0), (Cin, Hin) and a straight line which connects coordinates (Cr1, Hr1), (Cr2, Hr2), and the C component value Ct3 at the intersection coordinate of a straight line that connects CH system coordinates (0,0), (Cout, Hout) and a straight line which connects coordinates (Ct1, Ht1), (Ct2, Ht2). The calculated C component vales Cr3 and Ct3 are outputted to the L control circuit 22d along with the current pixel C component value Cin and the corrected C component value Cout described above.

$$Cr3=Cr1+(Cr2-Cr1)\times\beta/(\alpha+\beta)$$

$$Ct3=Ct1+(Ct2-Ct1)\times\delta/(\gamma+\delta) \quad (3)$$

Figure 10:
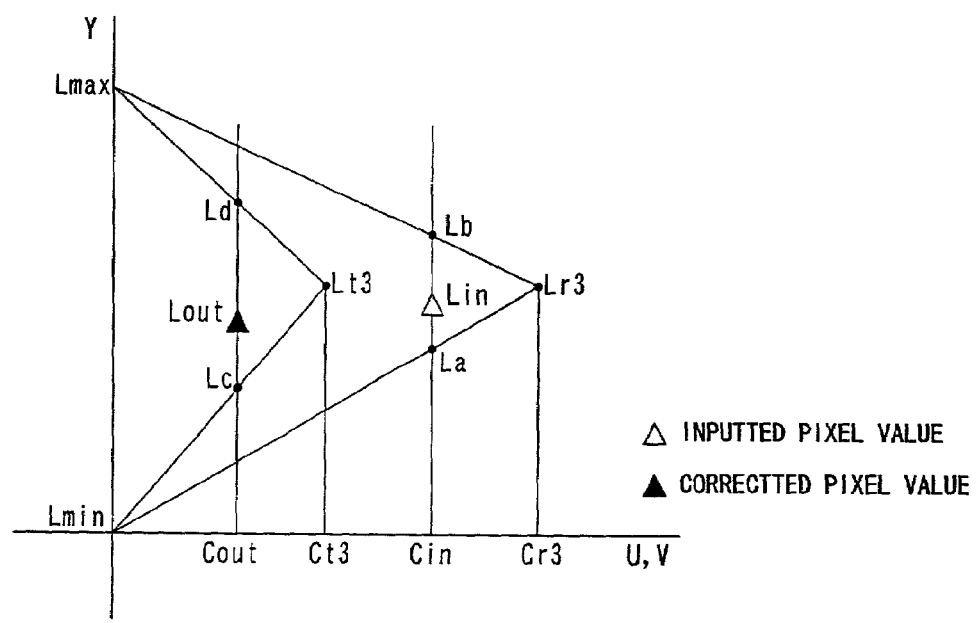
FIG. 10 is an illustrative view showing still another part of a function of an embodiment in FIG. 1.

The L control circuit 22d fetches a current pixel L component value Lin from the LCH conversion circuit 22c, and calculates a corrected L component value Lout according to the equation (4) shown in FIG. 10. Lmax and Lmin shown in FIG. 10 are respectively a maximum value and a minimum value of an expression range of L (luminance). A current pixel value (input pixel value) exists on a surface formed by LCH system coordinates (Lmax, 0, 0), (Lmin, 0, 0) and (Lr3, Cr3, Hin) (a surface which cuts down a YUV space by the hue Hin). On the other hand, a corrected pixel value exists on a surface formed by LCH system coordinates (Lmax, 0, 0), (Lmin, 0, 0) and (Lt3, Ct3, Hout) (a surface which cuts down a YUV space by the hue Hout).

$$Lout=(Lin-La)\times(Ld-Lc)/(Lb-La)+Lc \quad (4)$$

$$La=Cin/Cr3\times(Lr3-Lmin)$$

$$Lb=Cin/Cr3\times(Lr3-Lmax)+Lmax$$

$$Lc=Cout/Ct3\times(Lt3-Lmin)$$

$$Ld=Cout/Ct3\times(Lt3-Lmax)+Lmax$$

$$Lr3=Lr1+(Lr2-Lr1)\times\beta/(\alpha+\beta)$$

$$Lt3=Lt1+(Lt2-Lt1)\times\delta/(\gamma+\delta)$$

The corrected pixel value is defined by the corrected H component value Hout, the corrected C component value Cout and the corrected L component value Lout calculated as above. It is noted that the current pixel value is defined by the current pixel H component value Hin, the current pixel C component value Cin and the current pixel L component value Lin outputted from the LCH conversion circuit 22c.

If an operator manipulates the image quality control key 46 to select an image quality control mode, the CPU 32 processes flowcharts shown in FIGS. 13–17. In step S21 the process controls the SW1 and the character generator 36 so as to display the image quality control menu shown in FIG. 11 on the monitor 30. It is noted, however, at this time a color distribution map, a color sample, the C component value and the H component value are not displayed. Furthermore, the cursor points at any one of menu items "data 1", "data 2" and "data 3", and then becomes movable among the menu items.

When the operator manipulates the cursor key 48, the CPU 32 determines YES in step S23, and then moves the cursor in step S25. If the set key 50 is operated when the cursor points at a desired menu item, YES is determined in step S27, and in steps S29 and a S31 determined is which menu item was selected. If "data 1" is selected, the process proceeds from the step S29 to the step S31, the 12 target values are read from the target value table 22$i$. If "data 2" is selected, the process proceeds from the step S31 to the step S35, the 12 target values are read from the target value table 22$j$. If "data 3" is selected, the process proceeds from the step S31 to the step S37, the 12 target values are read from the target value table 22$k$. The read target values are written into the memory 32$a$.

Figure 11:
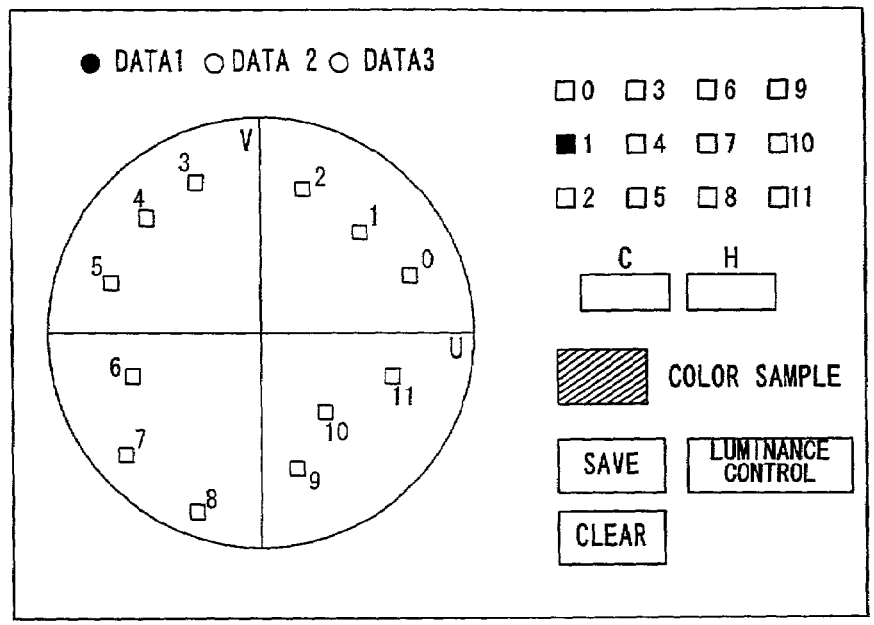
FIG. 11 is an illustrative view showing one example of an image quality control screen.

Upon completion of reading the target values, the process draws a color distribution map shown in FIG. 11 in step S39. The switch SW1 and the character generator 36 are controlled in this case as well, on the color distribution map displayed are 12 target value characters showing the target values stored in the memory 32$a$. In step S41 a display position of the cursor is renewed. Due to this, the cursor becomes movable among 14 menu items which are "0"–"11" showing the target value numbers, "SAVE", "CLEAR" and "LUMINANCE CONTROL". If the operator manipulates the cursor key 48, the CPU 32 determines YES in step S43, and moves the cursor in step S45. On the other hand, if the operator manipulates the set key 50, the CPU 32 determines YES in step S47, and in steps S49, S51 and S101 shown in FIG. 16 it is determined which menu item was selected.

When any one of the target value Nos. is selected, the CPU 32 proceeds the process from the step S49 to step S53 so as to blink the target value character corresponding to the selected target value No on the color distribution map. For example, when the target value No. "1" is selected, the target value character located in the center of the first quadrant blinks. In step S55, the C component value and H component value corresponding to the blinking target value character is read from the memory 32$a$ and are displayed on the screen. In step S57 a color sample defined by the target value corresponding to the blinking target value character is displayed on the screen. While the C component value and the H component value are displayed by a control of the switch SW1 and the character generator 36 similar to the above description, the color sample is displayed by reading the target value represented by the LCH system (L component value, C component value, H component value) from the memory 32$a$, converting them into YUV system, storing the converted YUV data in the image data storage area 26 of the SDRAM26 and then giving a process command to the video encoder 28. The display position of the C component value, the H component value and the color sample is the center left on the screen as shown in FIG. 11.

If the operator manipulates the cursor key 48 in this state, the CPU 32 proceeds the process from step S59 to step S60 so as to determine whether or not the move destination is within a movable area. In other words, the blinking target value character is capable of moving only in the same quadrant and in a range that the H component value does not lie across other H component values. For example, the target value character of the target value No. "1" is capable of moving only in the first quadrant and in a range that its degree is bigger than that defined by the target value character of the target value No. "0" and that its degree is smaller than that defined by the target value character of the target value No. "2". Due to this, the process determines the move destination in the step 60, and if within the movable area, then the process proceeds to step S61. If beyond the movable area, then the process returns to the step S59.

In the step S61 the process moves the blinking target value character. In the succeeding step S63, in addition to calculating the C component value and the H component value corresponding to the position of the target value character after its moving, the original C component value and the H component value in the memory 32$a$ are renewed by the calculated new C component value and H component value. Upon completing the calculation process, the process returns to the step S55. By the steps S55 and S57 being reprocessed, the C, H component values and the color of the color sample on the screen are renewed. On the other hand, if the operator manipulates the set key 50, in step S65 YES is determined, and in the step S67 the blinking of the target value character is stopped, and then the process returns to the step S43.

Figure 12:
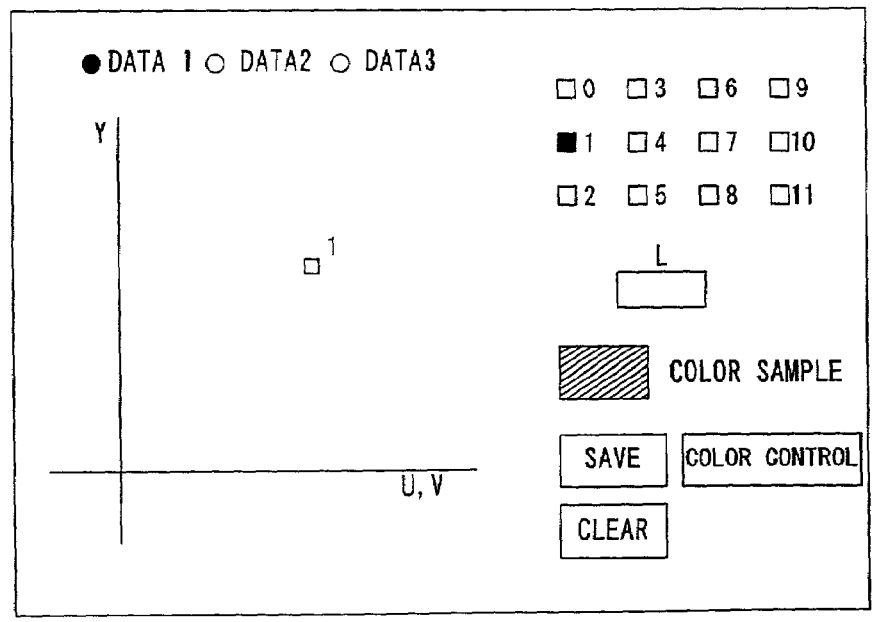
FIG. 12 is an illustrative view showing another example of an image quality control screen.
Figure 13:
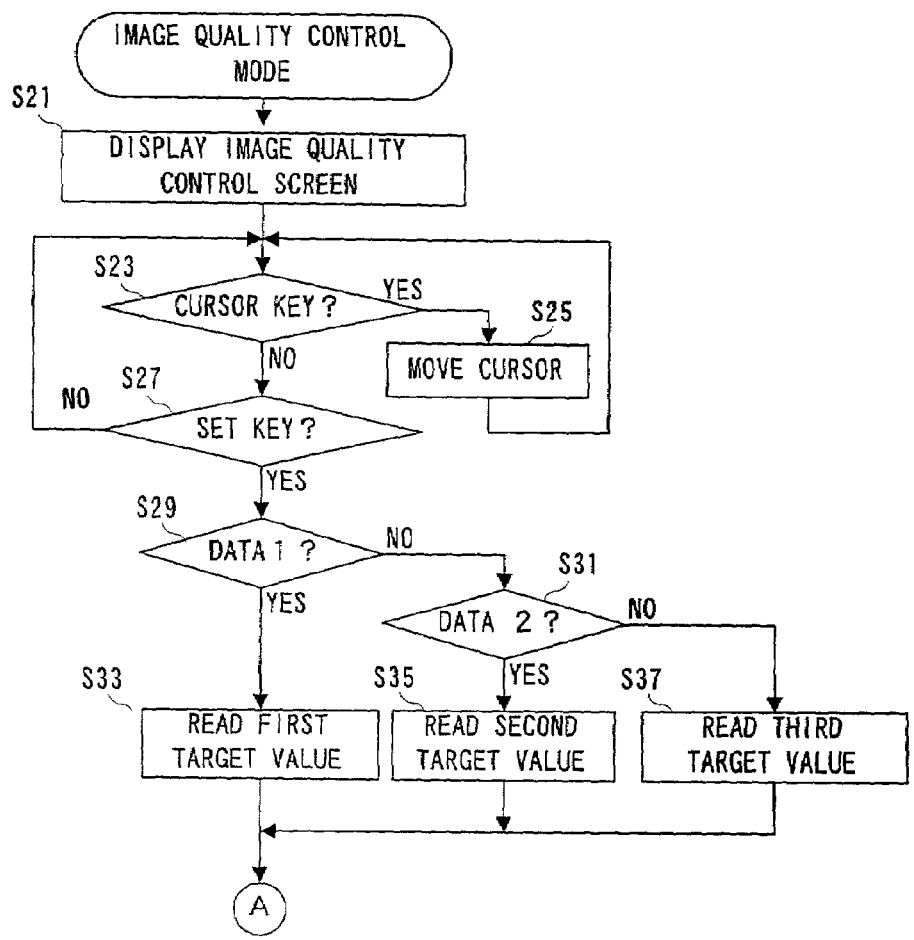
FIG. 13 is a flowchart showing one part of a function of a CPU in an image control mode.
Figure 14:
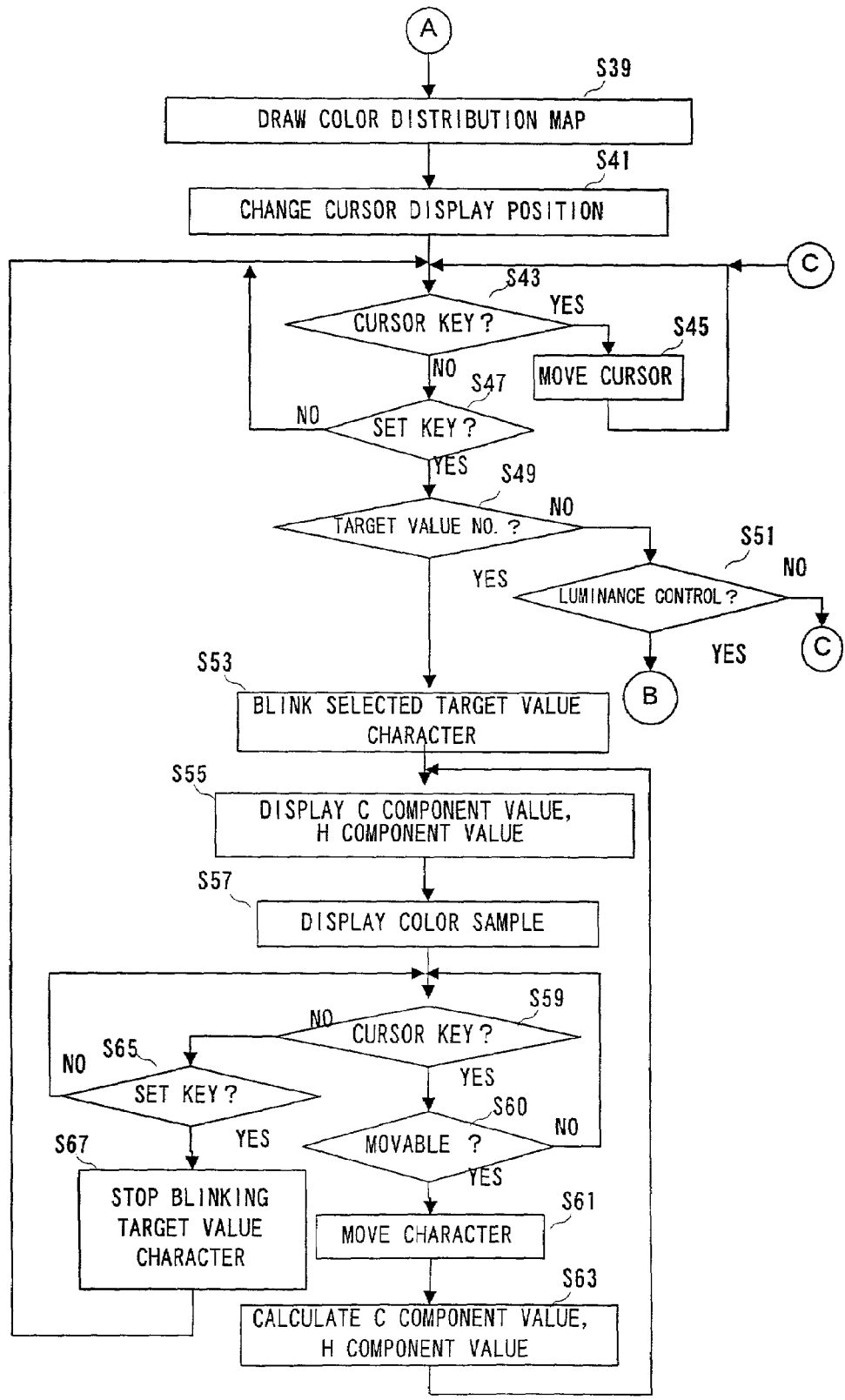
FIG. 14 is a flowchart showing another part of a function of a CPU in an image control mode.
Figure 15:
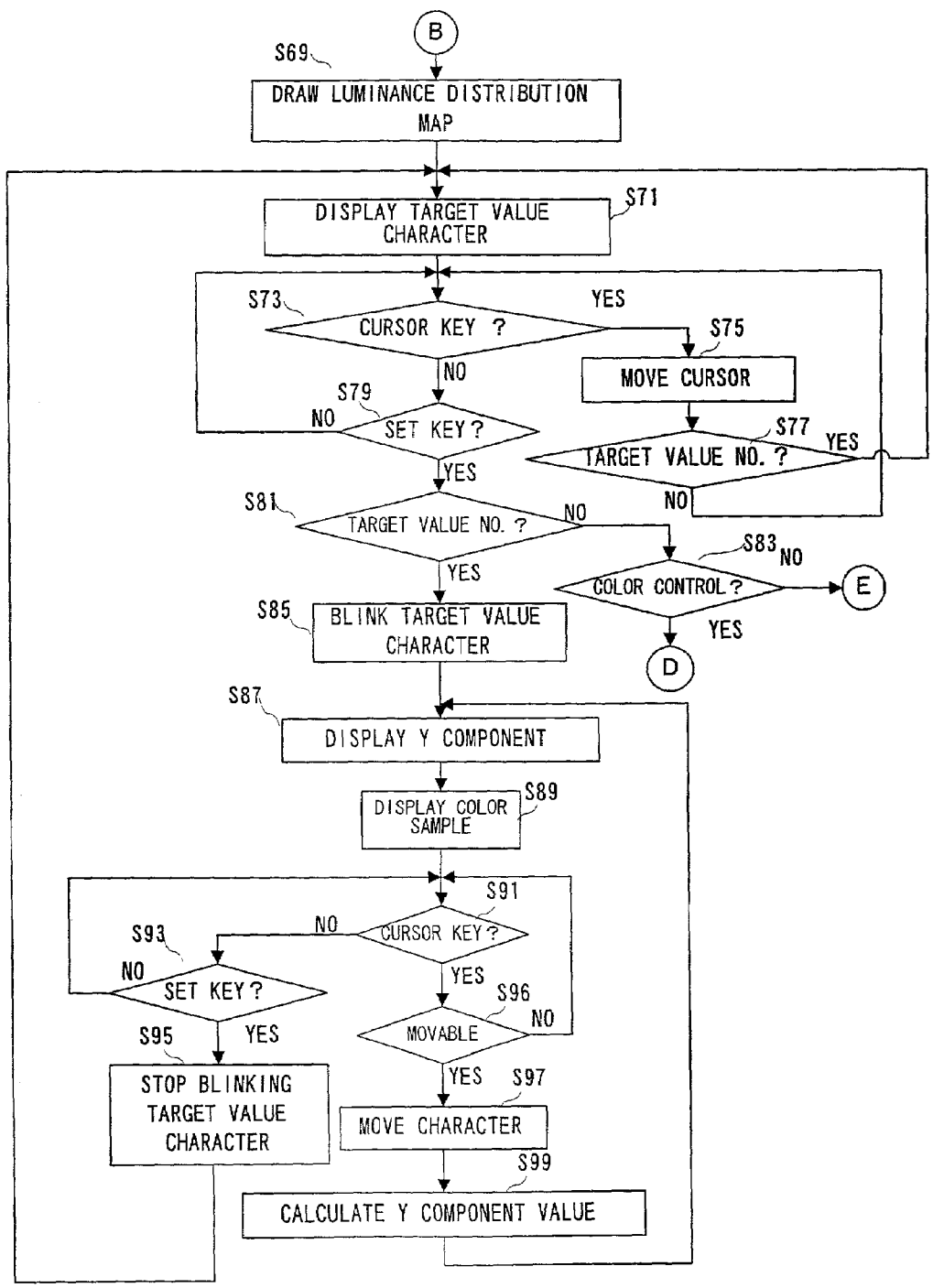
FIG. 15 is a flowchart showing still another part of a function of a CPU in an image control mode.

If YES is determined in the step S51, namely if the operator selects the menu item of "LUMINANCE CONTROL", the process proceeds to step S69 in FIG. 15 so as to display the luminance distribution map shown in FIG. 12 on the screen. In step S71 the target value corresponding to the target value No. which the cursor points at is read from the memory 32$a$, and the target value character is displayed on the luminance distribution map based upon the read target value. When the cursor points at the target value No. "1", the target value character shown in FIG. 12 is displayed.

In step S73 it is determined whether or not the cursor key 48 is manipulated. If YES, then the process moves the cursor in step S75. Subsequently, it is determined in step S77 whether or not the menu item which the moved cursor points at is the target value No. While if NO, the process returns to the step S73, if YES, the process returns to the step S71. Due to this, if the moved cursor points at the target value No., the target value character corresponding to the target value No. of the point destination is displayed on the luminance distribution map. If the set key 50 is pressed with the cursor pointing at the desired menu item, in steps S81, S83 and S101 in FIG. 16 determined is which menu item was selected.

When the target value is selected, the CPU 32 proceeds from the step S81 to step S85 so as to blink the target value character on the luminance distribution map. Furthermore, in step S87 the Y component value of the blinking target value character is read from the memory 32$a$, and is displayed on the screen. Along with this, in step S89 the color sample defined by the target value corresponding to the blinking target value character is displayed on the screen.

If the operator manipulates the cursor key 48, the CPU 32 proceeds from step S91 to step S96 so as to determine whether or not the move destination is within a movable area. In other words, on the luminance distribution map, the target value character is capable of moving only in the vertical position, and even in the vertical direction, neither capable of exceeding the maximum L level nor to fall short of the minimum L level. Due to this, in the step S96 the move destination is determined, and if determined within a movable area, the process proceeds to step S97, however, if beyond the movable area the process returns to step S91.

In the step S97 the process moves the blinking target value character, and in step S99 the process calculates the L component value indicated by the moved target value character, and renews L component value in the memory 32$a$ by the calculated L component. Upon completing the step S99, the processes of the steps S87 and S89 are once again carried out. As a result, the L component value on the screen is renewed by the calculated Y component value, and the color of the color sample on the screen is renewed by a color defined by the newly calculated Y component value and the present C component value and H component value. On the other hand, if the operator manipulates the set key 50, the CPU 32 determines YES in step S93, and returns to the step S71 after completing the blink of the target value character in step S95.

Figure 16:
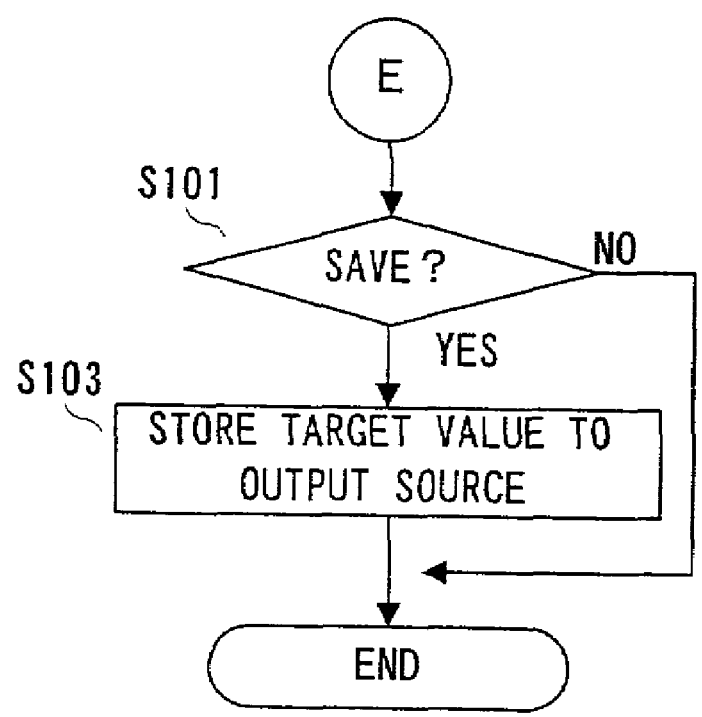
FIG. 16 is a flowchart showing yet another part of a function of a CPU in an image control mode.

In the step S101 shown in FIG. 16, it is determined whether or not the menu item of "SAVE" is selected. If YES, in step S103 the 12 target values are read from the memory 32*a* so as to store into the original target value table (22*i*, 22*j* or 22*k*) from which the former 12 target values were read, and then the process is completed. On the other hand, if NO in the step S101, the selected menu item is regarded as "CLEAR", and the process is completed without processing the step S103. Accordingly, the target values of the target value table of the read destination are changed at all.

As understood from the above descriptions, if an object is photographed, the LCH conversion circuit 22*c* shown in FIG. 2 detects the pixel value (L component value, C component value and H component value) from each of the pixel signals that form an image signal of the object. L, C and H are luminance, chroma and hue respectively, and each forms an image quality evaluation element. On the other hand, a plurality of reference values (reference L component value, reference C component value, reference H component value) corresponding to the same image quality evaluation elements are held on the reference value table 22*h*. Furthermore, a plurality of target values (target L component value, target C component value and target H component value) corresponding to the same image quality evaluation element is held in each of the target value tables 22*i*–22*k*. The L control circuit 22*d*, the C control circuit 22*e* and the H control circuit 22*f* respectively correct the L component value, the C component value and the H component value detected by the LCH conversion circuit 22*c* based upon the reference value table 22*h* and any one of the target value tables 22*i*–22*k*. In this manner, an image quality control is subjected to the image signal of a photographed object. The target values held by the target value tables 22*i*–22*k* are controlled arbitrarily by the CPU 32 in response to the operator's key manipulation. Due to this, a characteristic of color expression of a photographed object image is freely modified on the side of the operator.

The area determination circuit 22*g* fetches the current pixel H component value from the LCH conversion circuit 22*c*, detects a target value which meets a predetermined condition between this current pixel H component from the reference value table 22*h*, and detects a target value corresponding to the detected reference value from any one of the target tables 22*i*–22*k*. The L control circuit 22*d*, the C control circuit 22*e* and the H control circuit 22*f* correct the pixel value outputted from the LCH conversion circuit 22*c* based upon the reference value and target value detected by the area determination circuit 22.

Concretely, the area determination circuit 22*g* reads two reference values in which the reference H component values sandwich the current pixel H component value from the reference value table 22*h*, in addition from any one of the target value tables 22*i*–22 reads two target values to which the same No. as the two read reference values are assigned. The L conversion circuit 22*d* corrects the current pixel L component value based upon the two reference L component values and the two target L component values as read, and the C control circuit 22*e* corrects the current pixel C component value based upon the two reference C component values and two target C component values as read, and then the H control circuit 22*f* corrects the current pixel H component value based upon the two reference H component values and the two target H component values as read.

Upon controlling an image quality, either the color distribution map formed by a U coordinate axis and a V coordinate axis or the luminance distribution map formed by a Y coordinate axis and a UV coordinate axis is displayed on the monitor 30, and the plurality of target value characters are arranged on the distribution map. This target value character moves arbitrarily on the distribution map in response to the manipulation of the cursor key 48, and if the set key 50 is pressed, the target value is renewed depending upon the position of the moved target value character. The color sample defined by the target value and this target value are also displayed on the monitor 30.

Figures 17, 18:
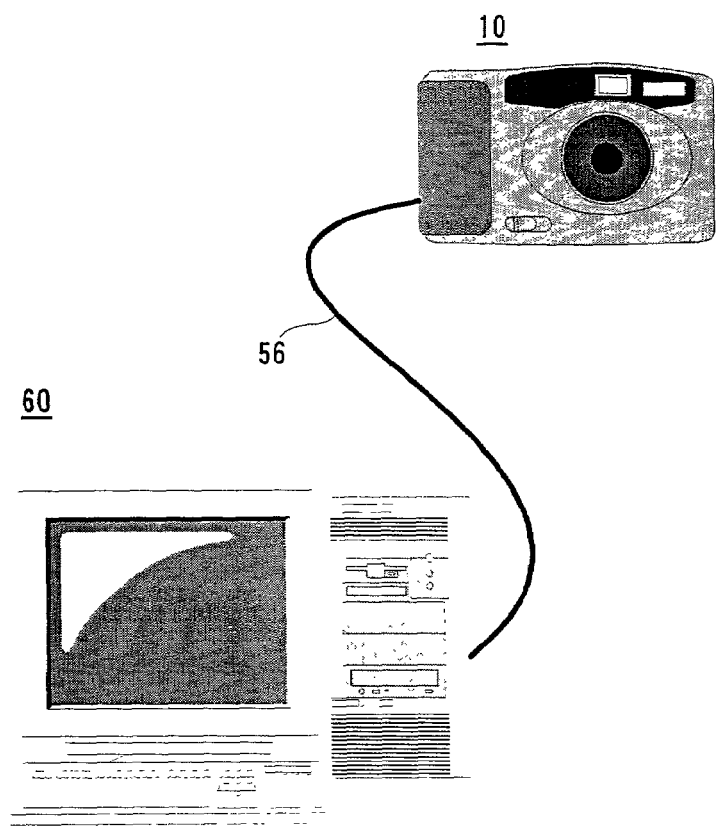
FIG. 17 is an illustrative view showing a connecting state of a digital camera and an inspection device in manufacturing process.
FIG. 18 is an illustrative view showing one example of a color chart used in the manufacturing process shown in FIG. 17.
Figure 19:
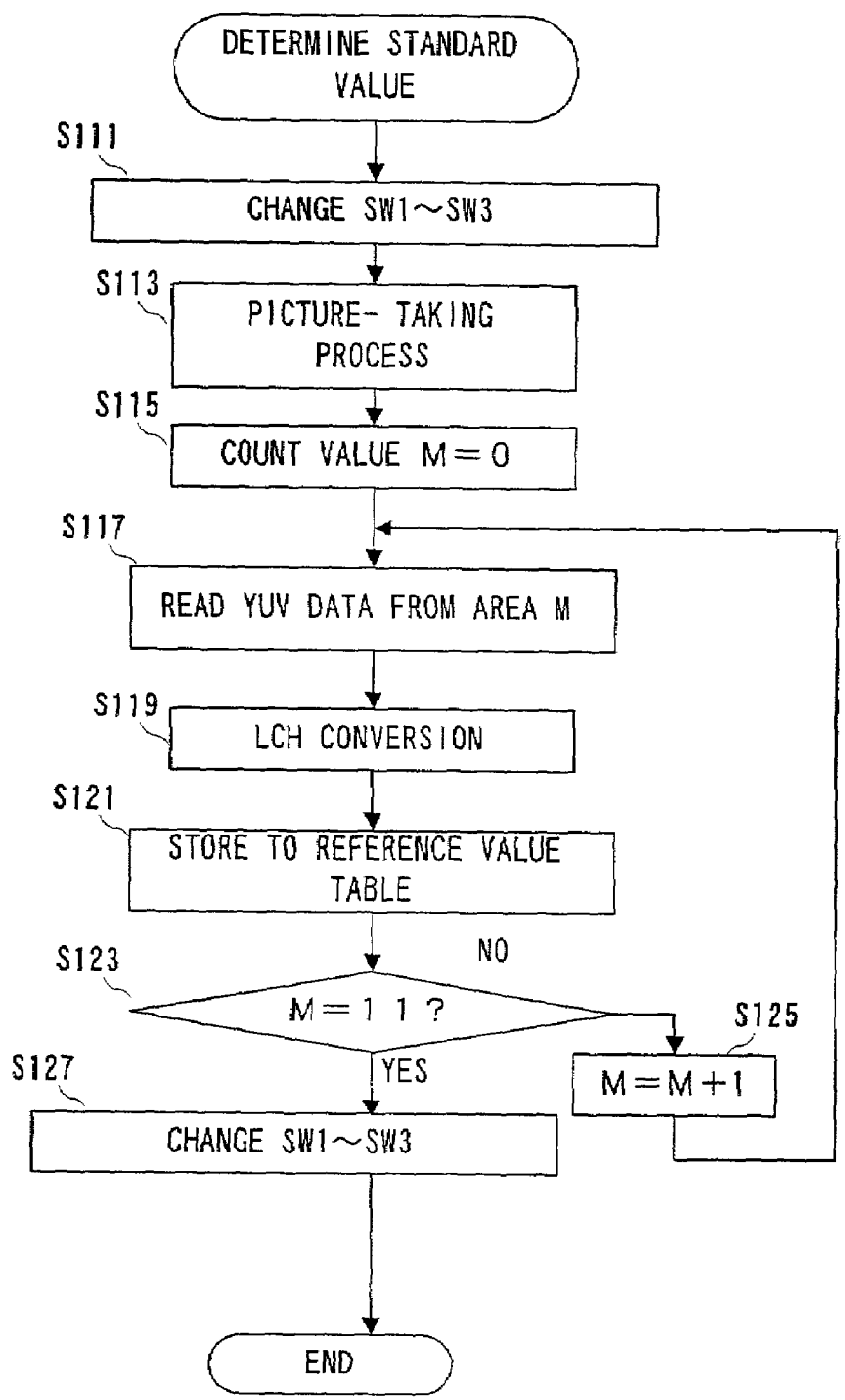
FIG. 19 is a flowchart showing one part of the function of a digital camera in the manufacturing process shown in FIG. 17.

Each of the reference values stored on the reference value table 22*h* is determined in manufacturing process as follows; Firstly, the digital camera 10 and the inspection device 60 are connected by the cable 56 as shown in FIG. 17, and a test chart 70 shown in FIG. 18 is placed at the front of the digital camera 10. On this test chart 70,12 color areas 0–11 are formed, a different color is drawn in each color area. The colors of the color areas 0–11 correspond individually to the reference value Nos. 0–11 of the reference value table 22*h* shown in FIG. 3. In this state, if a setting command is outputted from the inspection device 60 to the digital camera 10, the setting command is then given to the CPU 32 through an I/F circuit 54. The CPU 32 processes a flowchart shown in FIG. 19 in response to the given setting command.

To begin with, in step Sill the process changes the switches SW1–SW3 shown in FIG. 2 to the side of a YUV conversion circuit 22*m*, and in step S113 a picture-taking process is carried out. Due to this, a color chart is taken a picture by the CCD imager 14, and a camera data corresponding to the taken color chart is applied to the signal process circuit 22. In the signal process circuit 22, a YUV data is generated by the YUV conversion circuit 22*m* based upon the inputted camera data. The generated YUV data is outputted from the signal process circuit 22 through the switches SW1–SW3, and stored in the image data storage area 26*a* of the SDRAM26 by the memory control circuit 24.

In step S115 the count value M of the counter 32*b* is set to "0", in the following step S117 the YUV data showing the color of the color chart 70's color area M is read through the memory control circuit 24. Subsequently, the read YUV data is converted in the LCH data in step S119, and then the converted LCH data or L component value, C component value and H component value are stored in a column corresponding to the reference value No. M on the reference value table 22*h* in step S121.

In step S123, the count value M is compared with "11", if M<11 is held, in step S125 the counter 32*b* is incremented, and then the process returns to S117. As a result, the process of the steps S117–S121 are repeated 12 times, and the L component value, the C component value and the H component value showing the color of each of the areas 0–11 are set to the reference value table 22*h*. When the count value M reaches "11", YES is determined in the step S123 the switches SW1–SW3 are switched to the side of the YUV conversion circuit 22*n* in step S127, and then the reference value decision process is finished.

Although a photoelectric conversion characteristic of the CCD imager 14 varies depending on each element, it is possible to resolve the variation of the photoelectric conversion characteristic by individually carrying out such a process. It is noted that if no consideration is taken in regard to the variation of the photoelectric conversion characteristic of the CCD imager, a reference value generated by a certain digital camera may be adapted for another digital camera. It is noted that the target value is manually set to the target value tables 22i–22k in the inspection stage.

Although in this embodiment the CCD imager was used as an image censor, a CMOS imager may be used instead of the CCD imager. Furthermore, in this embodiment a non-volatile semiconductor was used as a recording medium, a magnetooptical disk may be used instead.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera for subjecting an image signal of a photographed object to an image quality control, comprising:
   a pixel value detector to detect a pixel value which relates to a predetermined image quality evaluation element from each pixel signal forming said image signal;
   a first table capable of holding a plurality of reference values which relates to said predetermined image quality evaluation element;
   a second table capable of holding a plurality of target values which relates to said predetermined image quality evaluation element;
   a corrector to correct said pixel value based upon said first table and said second table; and
   a controller to control said plurality of target values arbitrarily.

2. A digital camera according to claim 1, wherein said corrector includes a reference value detector to detect reference values which meet a predetermined condition between said pixel value from said first table, a target value detector to detect target values corresponding to the reference values detected by said reference value detector from said second table, and a pixel value corrector to correct said pixel value based upon the reference values detected by said reference value detector and the target value detected by said target value detector.

3. A digital camera according to claim 2, wherein said predetermined image quality evaluation element includes a hue, said reference value detector detects two reference values which sandwich said pixel value in regard to the hue, and said target value detector detects two target values corresponding to the two reference values detected by said reference value detector.

4. A digital camera according to claim 3, wherein said pixel value corrector includes a hue corrector to correct a hue component of said pixel value based upon hue components of said two reference values and hue components of said two target values.

5. A digital camera according to claim 3, wherein said predetermined image quality evaluation element further includes a chroma, said pixel value corrector includes a chroma corrector to correct a chroma component of said pixel value based upon chroma components of said two reference values and chroma components of said two target values.

6. A digital camera according to claim 3, wherein said predetermined image quality evaluation element further includes a luminance, said pixel value corrector includes a luminance corrector to correct a luminance component of said pixel value based upon luminance components of said two reference values and luminance components of said two target values.

7. A digital camera according to claim 1, wherein said controller includes a character displayer to display a character showing a target value in an area formed by a plurality of coordinate axes, a mover to arbitrarily move said character in said area and a renewer to renew the target value depending upon a position of said character moved by said mover.

8. A digital camera according to claim 7, wherein said controller further includes a color expresser to express a color defined by the target value renewed by said renewer.

9. A digital camera according to claim 7, wherein said controller further includes a target value displayer to display the target value renewed by said renewer.

10. A digital camera according to claim 1, further comprising:
    a specific image signal generator to generate a specific image signal corresponding to a specific object on which a plurality of colors are drawn; and
    a reference value generator to generate said plurality of reference values based upon said specific image signal.

11. A digital camera subjecting an image quality control to an image signal of a photographed object, comprising:
    a pixel value detector to detect a pixel value which relates to a predetermined image quality evaluation element from each pixel signal forming said image signal;
    a first table capable of holding a plurality of reference values which relates to said predetermined image quality evaluation element;
    a second table capable of holding a plurality of target values which relates to said predetermined image evaluation element; and
    a corrector to correct said pixel value based upon said first table and said second table, wherein said plurality of reference values are determined based upon a reference image signal obtained by photographing a reference object.

* * * * *